United States Patent
Yoshie

(10) Patent No.: US 8,220,914 B2
(45) Date of Patent: Jul. 17, 2012

(54) LABEL DETECTION METHOD AND LABEL PRINTER

(75) Inventor: Shinichi Yoshie, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 367 days.

(21) Appl. No.: 12/704,724

(22) Filed: Feb. 12, 2010

(65) Prior Publication Data
US 2010/0208026 A1 Aug. 19, 2010

(30) Foreign Application Priority Data
Feb. 19, 2009 (JP) ................................. 2009-036262

(51) Int. Cl.
*G06K 7/00* (2006.01)
(52) U.S. Cl. ........................................ 347/101; 347/218
(58) Field of Classification Search .................... 347/19, 347/101, 218
See application file for complete search history.

(56) References Cited

U.S. PATENT DOCUMENTS

| | | | |
|---|---|---|---|
| 6,984,082 B2 * | 1/2006 | Endo | 400/579 |
| 7,129,490 B2 * | 10/2006 | Olson et al. | 250/341.1 |
| 7,407,245 B2 * | 8/2008 | Endo | 347/14 |
| 2004/0246285 A1 * | 12/2004 | Endo | 347/14 |
| 2004/0247364 A1 * | 12/2004 | Endo | 400/579 |

FOREIGN PATENT DOCUMENTS

| | | |
|---|---|---|
| JP | 2001-180631 | 7/2001 |
| JP | 2003-040229 | 2/2003 |
| JP | 2003-155014 | 5/2003 |
| JP | 2005-314047 | * 11/2005 |

* cited by examiner

*Primary Examiner* — Huan Tran

(57) ABSTRACT

Labels can be detected on various types of label paper. Two photodetectors are disposed side by side in the transportation direction of label paper either above or below the transportation path of the printer, and a light-emitting device is disposed at a position opposite the photodetectors with the transportation path therebetween. Alternatively, the light-emitting device is disposed at a position between the photodetectors. Each time the label paper is advanced a unit amount, the light that passes through or the light that is reflected by the parts of the label paper at the detection positions on the transportation path is detected, and whether the amplified difference of these two detector outputs is greater than or equal to a specific threshold value set according to the difference in the transmittance of the liner and the label is determined. Passage of an edge part of a label or black mark between the detection positions is detected based on the result of this decision.

15 Claims, 11 Drawing Sheets

LABEL DETECTION METHOD AND LABEL PRINTER

CROSS-REFERENCE TO RELATED APPLICATION(S)

Japanese Patent application No. 2009-036262 is herein incorporated by reference in its entirety.

BACKGROUND

1. Field of Invention

The present invention relates to a label printer that detects labels on label paper by an optical sensor, and to a method of detecting labels using an optical sensor.

2. Description of Related Art

Label printers that print on label paper having labels affixed at a fixed interval on a continuous label liner, and detect the labels and index the label paper (convey the label paper to the printing start position) using an optical sensor disposed to the transportation path through which the label paper is conveyed, are known from the literature.

Japanese Unexamined Patent Appl. Pub. JP-A-2001-180631 teaches a label printer that uses label paper having detection marks preprinted at equal intervals on the back side of the liner, and labels affixed at this equal interval to the liner so that the position of the edge of each label is aligned with the edge of a detection mark. This label printer emits light from the light-emitting device of an optical sensor to the back side of the label paper, and determines the position of a label by detecting the position of a detection mark based on the change in light reflected or transmitted from the label paper when the detection mark passes the detection position of the optical sensor. As a result, an evaluation value (threshold value) corresponding to the amount of reflected or transmitted light detected by the optical sensor when the detection mark passes is preset in memory, and the detection marks are detected by determining if the signal output from the photodetector of the optical sensor is less than or equal to this threshold value.

Labels can also be detected without using such detection marks by using the difference in reflectance or transmittance between parts where labels are affixed to the liner (that is, the label part where both label and liner are present) and parts where the labels are not affixed (that is, the liner part where only the liner is present), setting the amount of light reflected or transmitted from the label part or the liner part as a threshold value, and comparing this threshold value with the output signal from the photodetector of the optical sensor.

However, with a method that sets the absolute value of the light reflected or transmitted from the detection mark or label part as a threshold value, the output values will differ when label paper with reflectance or transmittance that is different from the anticipated label paper is used, and accurate detection may not be possible. As a result, only the label paper that can be accurately detected is identified as recommended paper, and the choice of label paper that can be used is limited. This is, however, not user-friendly for users that want to use various other types of label paper.

Setting threshold values for detecting plural types of label paper is also conceivable, but in this situation the threshold value ranges are extremely narrow and the possibility of detection errors caused by noise increases.

Resetting the threshold values so that using label paper with different reflectance or transmittance characteristics can be used is also conceivable, but in this situation the appropriate threshold value must be reset whenever the type of label paper changes, and reconfiguring the detection device is time consuming. Configuration errors are also possible.

Furthermore, with a method that sets the absolute value of the reflectance or transmittance as the threshold value, the effect of variation in the sensitivity of the photodetector is great and accurate detection can be difficult when the difference in the reflectance or the difference in the transmittance of the label parts and the liner parts is small, or when the amount of reflected or transmitted light that is detected is small.

SUMMARY OF INVENTION

A label printer and a label detection method according to at least of one embodiment of the present invention can detect labels on a variety of different types of label paper with good accuracy using an inexpensive device configuration without needing to change the threshold value for each type of label paper and without needing to precisely adjust the photodetection sensitivity of the optical sensor.

A first aspect of the invention is a label detection method including steps of: conveying label paper having labels affixed at a specific interval on a continuous liner through a transportation path; detecting detection beams of emitted light that is emitted to the label paper at a plurality of detection positions in the transportation direction of the label paper on the transportation path; and detecting the labels or marks printed on the label paper based on a difference in the plural detection beams.

Preferably, this label detection method also has a step of determining if an edge part of a label or an edge part of a mark printed on the label paper is between the plurality of detection positions by determining if the difference in the plural detection beams is greater than a specific value.

A plurality of detection positions are thus set in sequence in the transportation direction of the label paper on the transportation path, and detection beams (reflected or transmitted light) of the light emitted to the label paper are detected at the plural detection positions while conveying the label paper. A configuration having two detection positions is described below.

When an edge part (leading end or trailing end) of a label or an edge part of a mark printed on the label paper passes between two detection positions, there is a difference between the detection beams at the two detection positions. This difference is based on the difference in the reflectance or the transmittance of the liner part and the label part, or the liner part and the mark. Therefore, by determining if there is a difference greater than or equal to a specific threshold value in the detection beams from the two detection positions, an edge part of a label or a mark passing the detection positions can be detected, and based thereon the position of the label on the label paper can be detected. A detection method that thus focuses on the difference in reflectance or transmittance of the liner part and label part, or the liner part and a mark, can thus detect a label or mark if there is a difference in the reflectance or transmittance even if label paper in which the absolute value of the reflectance or transmittance of the liner part and the label part or mark differs is used. As a result, labels or marks can be detected on a variety of different types of label paper with good accuracy without needing to change the threshold value for each type of label paper and without requiring precision adjustment.

Further preferably, the emitted light is emitted from a single light-emitting device.

This aspect of the invention can simplify the device configuration and reduce the parts count because light transmitted or reflected at a plurality of detection positions can be detected using only one light-emitting device. The output timing and intensity of the light emitted to the plural detection positions can also be made to match.

Further preferably, a plurality of photodetection devices disposed to receive light from the plurality of detection positions simultaneously detect the transmission of the emitted light through the label paper, or detect the reflection of the emitted light reflected by the label paper.

In this aspect of the invention, the output changes according to the change in the transmitted or reflected light reaching the photodetection device when the edge part of the label or mark passes each detection position, and by obtaining the difference of the outputs from at least two photodetection devices, detection is possible even with very small changes in output. As a result, methods that determine if this difference is greater than or equal to a specified threshold value can detect that the edge part of the label or mark passed each of the detection positions.

Further preferably, a plurality of photodetection devices are disposed to receive light from the plurality of detection positions; and a single light-emitting device is disposed opposite the photodetection devices with the transportation path therebetween.

In this aspect of the invention, change in the transmitted light reaching the photodetection devices when the edge part of a label or mark passes each detection position can be detected.

Yet further preferably, a plurality of photodetection devices are disposed to receive light from the plurality of detection positions; and a single light-emitting device is disposed beside and between the photodetection devices, and emits the emitted light to the plural detection positions.

In this aspect of the invention change in the reflected light reaching the photodetection devices when the edge part of a label or mark passes each detection position can be detected.

In another aspect of the invention, two photodetection devices are disposed to receive light from two detection positions; and the label detection method also has a step of determining if the difference of the outputs of the two photodetection devices based on the detected light is greater than a specified value.

In this aspect of the invention the slight output difference detected when one of the two photodetection devices detects a label or mark can be compared with the threshold value and the result determined with good accuracy.

Another aspect of the invention is a label printer including a transportation mechanism that conveys label paper having labels affixed at a specific interval on a continuous liner through a transportation path; a light-emitting unit that emits an emitted light to the label paper at a plurality of detection positions in the transportation direction of the label paper on the transportation path; a plurality of detection units that detect detection beams of the emitted light at the plural detection positions; and an evaluation unit evaluates the position of the label or marks printed on the label paper based on a difference of the output values of the plural detection units.

Preferably, the evaluation unit determines if an edge part of a label or an edge part of a mark printed on the label paper is between the plurality of detection positions by determining if the difference in the output values of the plural detection units is greater than a specific value.

Yet further preferably, the detection units are photodetection devices, and detect the transmission of the emitted light through the label paper, or detect the reflection of the emitted light reflected by the label paper.

With this aspect of the invention, the label printer detects detection beams (reflected or transmitted light) of the light emitted to the label paper from plural detection positions on the transportation path while conveying the label paper. A configuration having two detection positions is described below.

Passage of the liner of the label paper or an edge part of a label or mark on the paper passed the detection positions can be detected based on the difference between the detection beams from two detection positions. Therefore, even if the change in the light reflected or transmitted at the label part and liner part, or a mark and the liner part, is small, detection is possible if there is a difference in the detection beams at two detection positions. As a result, the positions of labels or marks can be accurately detected on a variety of different types of label paper without needing to change the threshold value for each type of label paper and without requiring precision adjustment.

Preferably, the light-emitting unit is a single light-emitting device.

This aspect of the invention can simplify the device configuration and reduce the parts count because light transmitted or reflected at a plurality of detection positions can be detected using only one light-emitting device. The output timing and intensity of the light emitted to the plural detection positions can also be made to match.

Further preferably, the detection units are photodetection devices; the light-emitting unit is a single light-emitting device; and the plural photodetection devices and the light-emitting device are disposed in opposition with the transportation path therebetween.

In this aspect of the invention, change in the transmitted light reaching the photodetection devices when the edge part of a label or mark passes each detection position can be detected.

Further preferably, the detection units are photodetection devices; the light-emitting unit is a single light-emitting device; and the light-emitting device is disposed beside and between the photodetection devices.

In this aspect of the invention change in the reflected light reaching the photodetection devices when the edge part of a label or mark passes each detection position can be detected.

Further preferably, the detection units are photodetection devices; the label printer also has a differential signal extraction unit to which output from two photodetection devices is input, and which outputs a difference of the output values of the two photodetection devices to the evaluation unit; and the evaluation unit determines if the label or an edge part of a mark printed on the label paper is between the two detection positions by determining if said difference is greater than a specified value.

With this aspect of the invention, whether a label or a mark printed on the label paper is present can be determined with good accuracy from a small output difference.

In a label printer according to another aspect of the invention, the detection units are photodetection devices; the label printer also has a differential amplifier unit that receives output from two photodetection devices, obtains and amplifies a difference of the outputs from the two photodetection devices, and outputs the amplified differential value to the evaluation unit; and the evaluation unit determines if the label or an edge part of a mark printed on the label paper is between the two detection positions by determining if the amplified differential value is greater than a specified value.

For example, the difference can be obtained and amplified by an analog differential amplifier circuit or by a CPU after analog/digital conversion of the detector output from two photodetection devices, and the amplified difference can be compared with a threshold value.

Effect of at Least of one Embodiment Of the Invention

A preferred embodiment of at least of one embodiment of the invention can accurately detect marks and the parts where labels are affixed to a variety of types of label paper without needing to change the threshold value for each type of label paper and without needing precise adjustment.

Other objects and attainments together with a fuller understanding of at least of one embodiment of the invention will become apparent and appreciated by referring to the following description and claims taken in conjunction with the accompanying drawings.

DESCRIPTION OF THE PREFERRED EMBODIMENTS

A preferred embodiment of a label printer according to at least of one embodiment of the invention is described below with reference to the accompanying figures.

General Configuration

Figure 1:
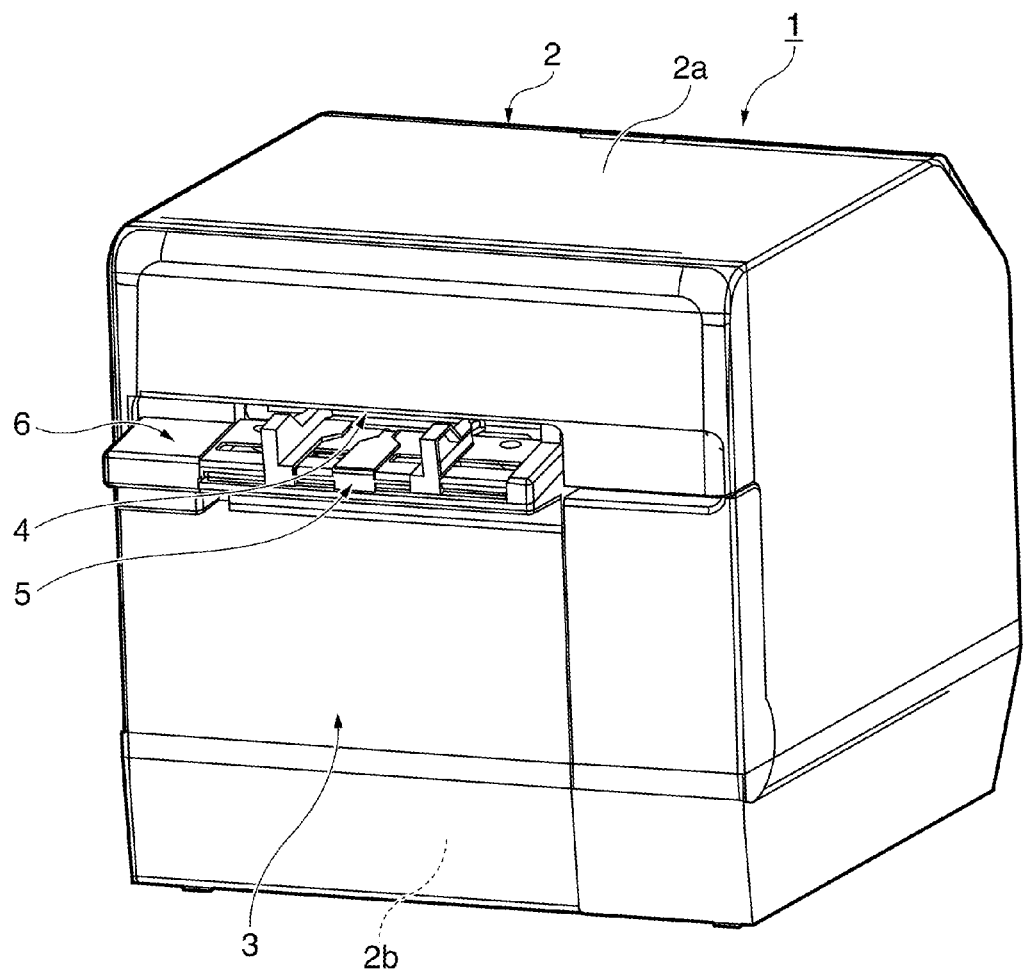
FIG. 1 is an external oblique view of a label printer according to a preferred embodiment of at least of one embodiment of the invention.
Figure 2:
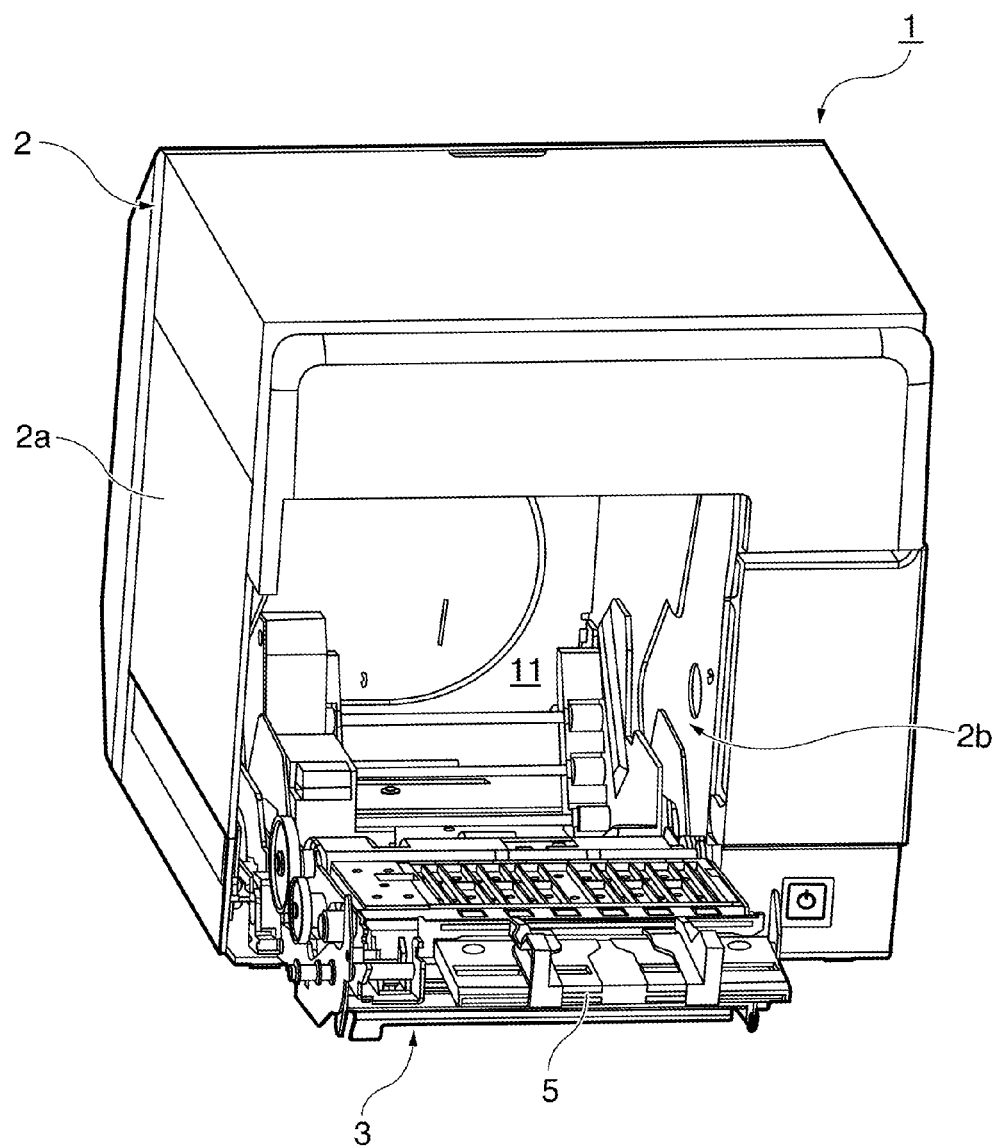
FIG. 2 is an external oblique view of the label printer with an access cover open.

FIG. 1 is an oblique view showing an inkjet label printer according to a first embodiment of the invention. FIG. 2 is an oblique view of the label printer with the access cover completely open.

The label printer 1 has a rectangular box-like body 2 and an access cover 3 that opens and closes and is disposed to the front of the body 2. A paper exit 4 of a specific width is formed at the front of the outside case 2a part of the printer body 2. An exit guide 5 projects to the front from the bottom of the paper exit 4, and a cover opening lever 6 is disposed beside the exit guide 5.

A rectangular opening 2b for loading and removing roll paper is formed in the outside case 2a below the exit guide 5 and cover opening lever 6, and this opening 2b is closed by the cover 3.

When the cover opening lever 6 is operated and the cover 3 is opened, the roll paper compartment 11 formed inside the printer opens as shown in FIG. 2, and the transportation path A (see FIG. 3) from the roll paper compartment 11 to the paper exit 4 also opens at the same time. Note that the cover case of the access cover 3 and the cover opening lever 6 are not shown in FIG. 2.

Figure 3:
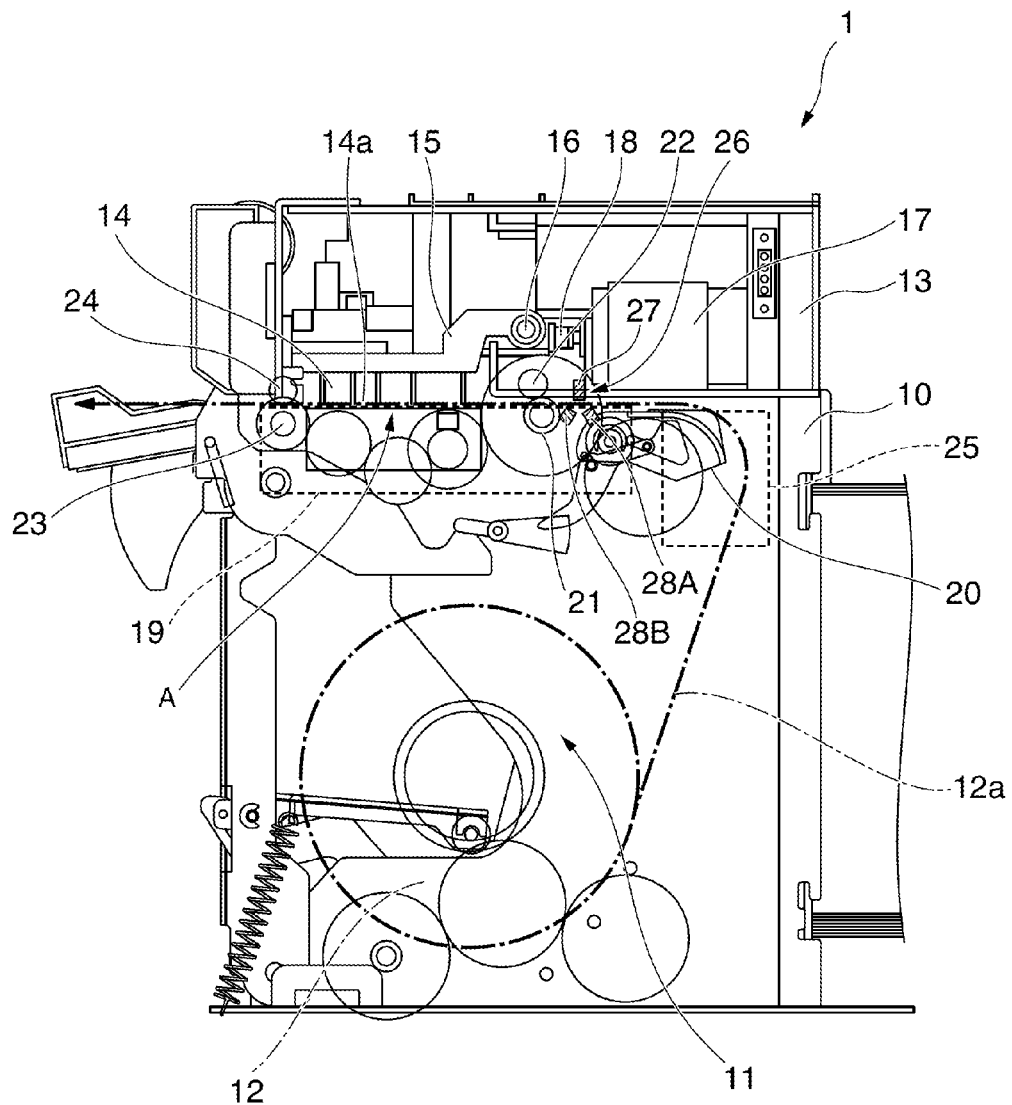
FIG. 3 is a vertical section view showing the internal configuration of the label printer.

FIG. 3 shows the internal configuration of the label printer 1. Roll paper 12 is stored inside the roll paper compartment 11 so that the roll paper 12 can roll on its side between the sides of the printer. The roll paper 12 is a continuous web of label paper 12a of a constant width wound into a roll.

A head unit frame 13 is disposed horizontally at the top of the printer frame 10 above the roll paper compartment 11. Disposed to the head unit frame 13 are an inkjet head 14, a carriage 15 that carries the inkjet head 14, and a carriage guide shaft 16 that guides movement of the carriage 15 widthwise to the printer.

A carriage transportation mechanism including a carriage motor 17 and timing belt 18 for moving the carriage 15 bidirectionally along the carriage guide shaft 16 is also disposed to the head unit frame 13.

A platen 19 extending horizontally widthwise to the printer is disposed below the inkjet head 14 with a constant gap to the ink nozzle surface 14a. A tension guide 20 that curves downward is attached on the back side of the platen 19. The label paper 12a pulled off the roll paper 12 stored in the roll paper compartment 11 is pulled through the transportation path A passed the printing position with specific tension applied to the paper by the tension guide 20.

A rear paper feed roller 21 is disposed behind the platen 19 (that is, on the upstream side in the transportation direction), and a rear paper pressure roller 22 is pressed from above with a predetermined force to the rear paper feed roller 21 with the label paper 12a therebetween. A front paper feed roller 23 is disposed on the front side of the platen 19 (downstream in the transportation direction), and a front paper pressure roller 24 is pressed from above to the front paper feed roller 23 with the label paper 12a therebetween. The rear paper feed roller 21 and the front paper feed roller 23 are rotationally driven synchronously by the paper transportation motor 25 disposed to the printer frame 10.

The label paper 12a delivered from the roll paper 12 in the roll paper compartment 11 is conveyed through the transportation path A (denoted by the bold dot-dash line in FIG. 3) passed the printing position of the platen 19 and is loaded sticking out from the paper exit 4. When the paper transportation motor 25 is driven with the paper 12a thus loaded, the rear paper feed roller 21 and front paper feed roller 23 turn and the label paper 12a is conveyed a predetermined distance. The inkjet head 14 is also driven synchronized to conveyance of the label paper 12a to print on the surface of the paper 12a as it passes the printing position. Paper transportation is then stopped with the printed portion of the paper 12a hanging out from the paper exit 4, the printed portion of the paper 12a is cut by the paper cutter 28 disposed near the paper exit 4, and the printed portion of the paper is discharged.

Label Paper

Figure 4:
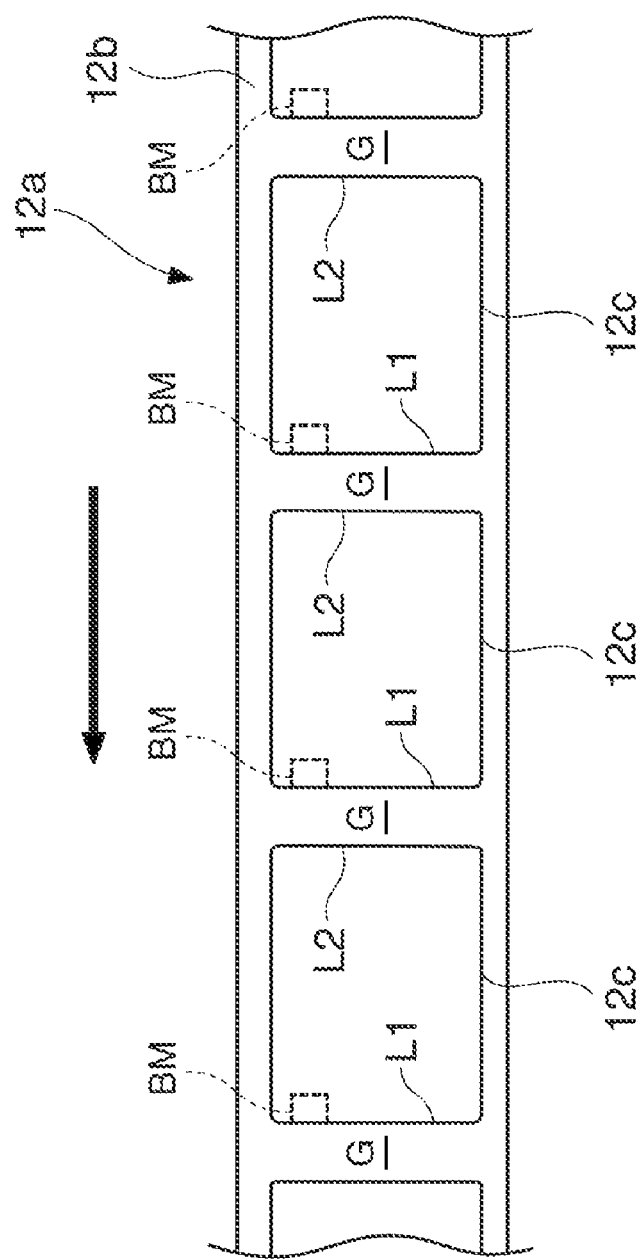
FIG. 4 is a plan view of label paper.

FIG. 4 is a plan view of label paper.

The label paper 12a has a continuous web liner 12b and labels 12c that are removably affixed to the surface of the liner 12b. In this embodiment of the invention the label paper 12a is die-cut label paper, and the labels 12c are cut while affixed to the liner 12b using a die-cut press. The labels 12c are affixed in series in the transportation direction on the liner 12b, and a label gap G of a constant length is disposed between adjacent labels 12c. Black marks BM used as index marks for positioning are printed on the back of the liner 12b at positions corresponding to the labels 12c.

The liner 12b is a backing medium made by processing a plastic film, coated paper, or other suitable medium into a continuous web of a constant width. The labels 12c are adhesive labels made from an opaque, white medium, for example, and the label 12c surface is suitably processed for inkjet printing. The material, thickness, color, and other characteristics of the liner 12b and labels 12c can be suitably selected according to the printing application, and in this embodiment of the invention are selected so that the difference in the transmittance of parts where only the liner 12b of the label paper 12a is present and the parts where a label 12c is present is greater than or equal to a specific threshold value.

Paper Detector

Figure 5A:
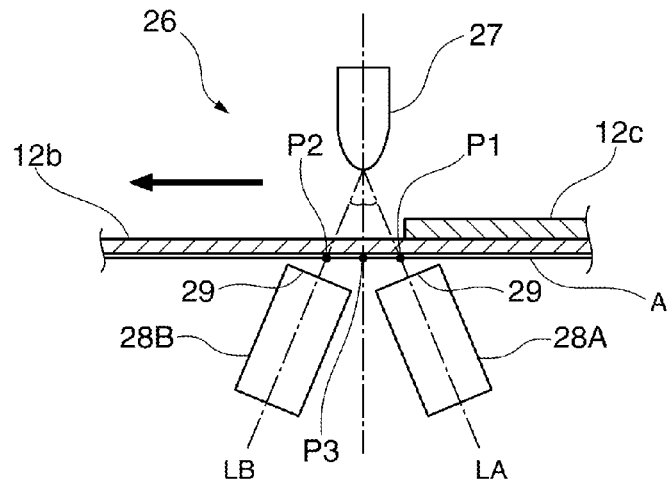
FIGS. 5A-5C are respective side views of the detection unit of the paper detector.

The detection unit of a paper detector 26 is disposed at a position on the upstream side of the inkjet head 14 on the transportation path A. FIG. 5A is a side view of the detection unit of a transmittance paper detector 26. The detection unit of this paper detector 26 is a transmittance photosensor having a light-emitting device 27 disposed above the transportation path A, and two photodetectors 28A and 28B disposed below the transportation path A. The photodetectors 28A and 28B are disposed to two detection positions P1 and P2 located in proximity to each other in the transportation direction of the label paper 12a.

The light-emitting device 27 is disposed directly above the midpoint P3 between the detection positions P1 and P2, and emits a detection beam from a single light-emitting device 27 to detection positions P1 and P2. The photodetectors 28A and 28B are disposed at an angle so that the photodetection surface 29 of each directly faces the light-emitting device 27.

More specifically, the photodetection axes LA and LB of the photodetectors 28A and 28B extend from detection position P1 and P2 to the light-emitting device 27, and are respectively inclined angle to the upstream side and downstream side of a line through the midpoint P3 and the light-emitting device 27. With this configuration, a detection beam from the light-emitting device 27 is emitted simultaneously with the same intensity to both detection positions P1 and P2, and light passing through each part of the label paper 12a conveyed passed the detection positions P1 and P2 is simultaneously detected by the photodetectors 28A and 28B. Note that the positions of the light-emitting device 27 and the photodetectors 28A and 28B can be reversed above and below the transportation path A.

Figure 5B:
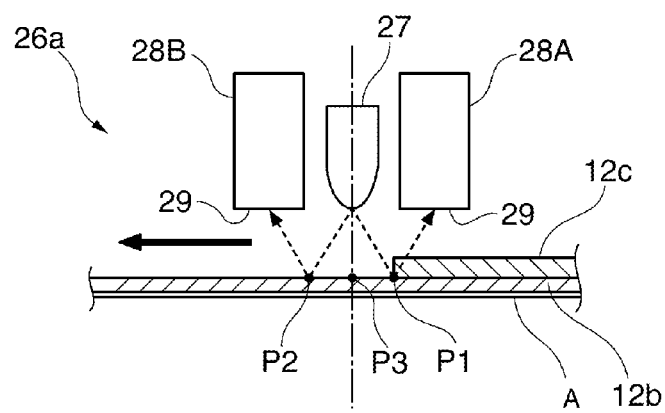
Figure 5C:
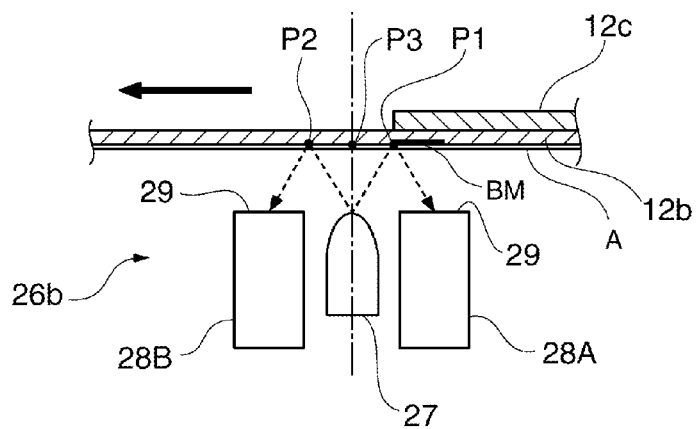

FIG. 5B and FIG. 5C are side views of the detection units of reflection paper detectors 26a and 26b. Reflection paper detectors 26a and 26b can be used instead of a transmission paper detector 26 described in FIG. 5A. The detection unit of paper detector 26a is disposed with the photodetector 28A, light-emitting device 27, and photodetector 28B in sequence from the upstream side of the transportation direction. The two photodetectors 28A and 28B are disposed to two detection positions P1 and P2 located in proximity in the transportation direction of the label paper 12a with the light-emitting device 27 therebetween.

The detection unit of the paper detector 26a shown in FIG. 5B is located on the side of the label paper 12a to which the labels 12c are affixed. The light-emitting device 27 is directly above the midpoint P3 between the detection positions P1 and P2, and emits a detection beam from the single light-emitting device 27 to both detection positions P1 and P2. The photodetectors 28A and 28B are disposed beside the light-emitting device 27 with the photodetection surface 29 of each facing the same side of the label paper as the light-emitting unit of the light-emitting device 27. The sensor beam from the light-emitting device 27 is emitted simultaneously with equal intensity to the detection positions P1 and P2, and light reflected by the parts on the side to which the labels 12c are affixed to the label paper label paper 12a passing the detection positions P1 and P2 is simultaneously incident to the photodetectors 28A and 28B. How much light is reflected from the detection positions P1 and P2 can therefore be simultaneously sensed by the photodetectors 28A and 28B, and labels 12c can be detected.

The detection unit of the paper detector 26b shown in FIG. 5C is located on the opposite side of the label paper 12a as the side on which the labels 12c are affixed. The light-emitting device 27 is directly below the midpoint P3 between the detection positions P1 and P2, and emits a detection beam from the single light-emitting device 27 to both detection positions P1 and P2. The photodetectors 28A and 28B are disposed beside the light-emitting device 27 with the photodetection surface 29 of each facing the same side of the label paper as the light-emitting unit of the light-emitting device 27. The sensor beam from the light-emitting device 27 is emitted simultaneously with equal intensity to the detection positions P1 and P2, and light reflected by the parts on the liner 12b side of the label paper label paper 12a passing the detection positions P1 and P2 is simultaneously incident to the photodetectors 28A and 28B. How much light is reflected from the detection positions P1 and P2 can therefore be simultaneously sensed by the photodetectors 28A and 28B, and the black marks BM printed on the liner 12b can be detected.

Figure 6:
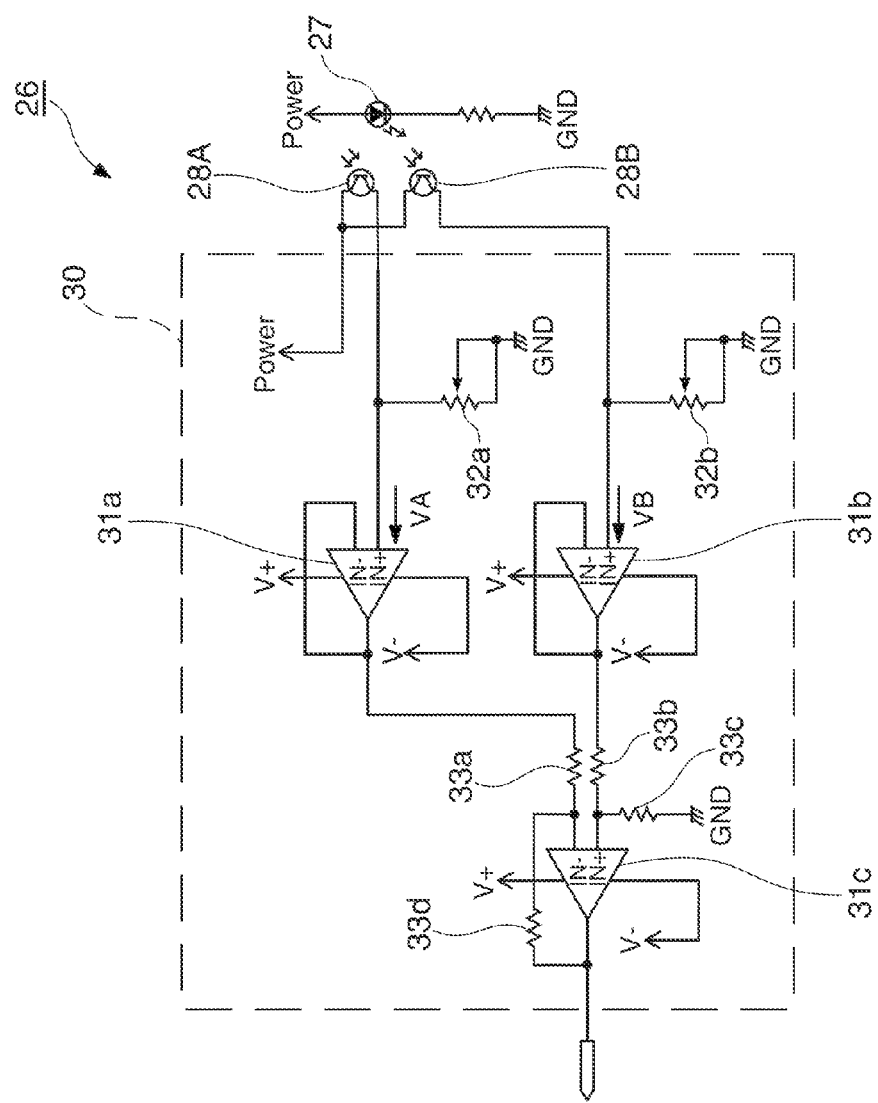
FIG. 6 describes the configuration of the differential signal extraction circuit.

FIG. 6 describes the configuration of a differential signal extraction circuit for outputting an amplified difference signal of the detector output from the two photodetectors.

The differential signal extraction circuit 30 has a non-inverting input terminal V+, an inverting input terminal V−, and differential amplifiers 31a to 31c each having an output terminal. The output voltage from the photodetectors 28A and 28B is input to the non-inverting input terminal V+ of differential amplifiers 31a and 31b. The output terminal of each differential amplifier 31a and 31b is fed back directly to the inverting input terminal V− of the differential amplifier 31a and 31b. Differential amplifiers 31a and 31b thus function as voltage follower circuits.

Because the output terminals of the photodetectors 28A and 28B go to ground through variable resistors 32a and 32b, the level of the output voltage VA, VB input from the photodetectors 28A and 28B to the differential amplifiers 31a and 31b can be appropriately adjusted by suitably adjusting the resistance of the variable resistors 32a and 32b. The variable resistors 32a and 32b are therefore preadjusted by the initial adjustment to cancel variations in the sensitivity of the photodetectors 28A and 28B so that the difference in transmittance at the detection positions P1 and P2 can be detected with good accuracy. Note, further, that during this initial adjustment the voltage input to the differential amplifiers 31a and 31b is set to a level whereby the output from the differential amplifiers 31a and 31b will not be saturated.

Figure 7:
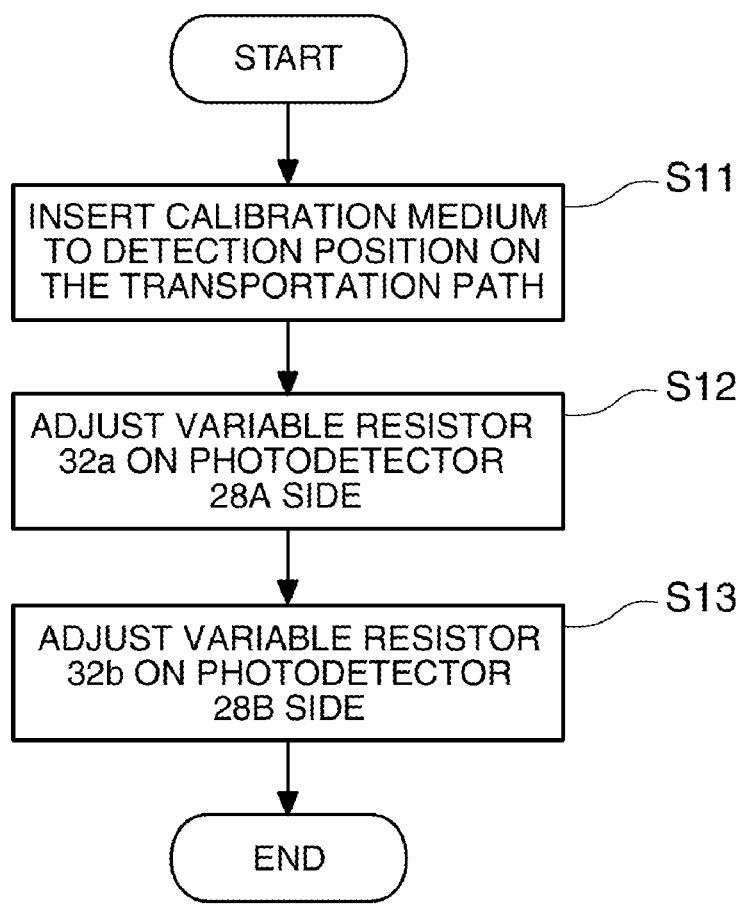
FIG. 7 is a flow chart describing the initial adjustment process of the differential signal extraction circuit.

FIG. 7 is a flow chart describing the initial adjustment process of the differential signal extraction circuit 30. In this embodiment of the invention, in order to enable detecting the position of the leading end L1 or the trailing end L2 (see FIG. 4) of a label 12c under the most difficult detection conditions expected, label paper 12a in which the transmittance of the liner 12b part is the highest among the types of label paper 12a expected to be used, or paper having transmittance equal to this liner 12b part, is prepared as a calibration medium.

In step S11 of the initial adjustment process calibration medium is set in the printer 1, and the medium is advanced until the part where transmittance is greatest is inserted between the light-emitting device 27 and the photodetectors 28A and 28B.

Then in step S12 the light-emitting device 27 emits a sensor beam, the output voltage of the photodetector 28A is input to differential amplifier 31a, and variable resistor 32a is adjusted to determine the resistance of the variable resistor 32a so that the output voltage VA from the photodetector 28A to the differential amplifier 31a does not exceed the saturation level of the differential amplifier 31a.

In step S13, the variable resistor 32b is adjusted to determine the resistance of the variable resistor 32b so that the output voltage VB from the photodetector 28B input to the differential amplifier 31b is the same level as the output voltage VA.

This resistance adjustment enables canceling out deviation in the sensitivity of the photodetectors 28A and 28B, and preventing the output from the differential amplifiers 31a and 31b from becoming saturated. Note that if the emission strength of the light-emitting device 27 is also adjusted in addition to adjusting the variable resistors 32a and 32b, the output voltages VA and VB can be adjusted through a wider range.

The output voltages from the differential amplifiers 31a and 31b are input through resistors 33a and 33b to the inverting input terminal V− and the non-inverting input terminal V+ of differential amplifier 31c. The non-inverting input terminal V+ goes to ground through resistor 33c. The output terminal of the differential amplifier 31c is fed back to the inverting input terminal V− through a resistor 33d. An amplified difference signal of the differential voltage of the output voltages from the differential amplifiers 31a and 31b amplified at a gain rate corresponding to the resistance of the resistors 33a to 33d is thus output as the output signal of the differential signal extraction circuit 30.

In the circuit configuration shown in FIG. 6, because the input signal from the photodetector 28B side is input to the non-inverting input terminal V+ of the differential amplifier 31c, the amplified difference signal from the differential amplifier 31c is positive when the output of photodetector 28B is greater than the output of photodetector 28A, and the amplified difference signal is negative when the output of photodetector 28B is less than the output of photodetector 28A.

Control System

Figure 8:
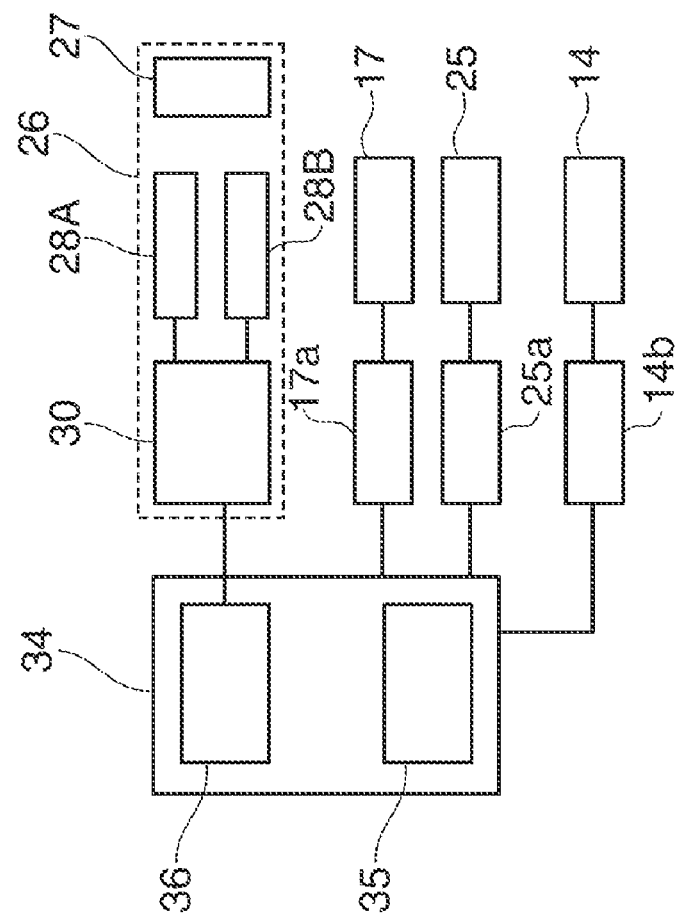
FIG. 8 is a schematic block diagram showing the control system of the label printer.

FIG. 8 is a schematic block diagram showing the control system of the printer 1.

The control system of this printer 1 is built around a control unit 34 including a CPU, ROM, and RAM. Threshold values used for control, control programs, and other data can be stored in a storage unit 35.

The inkjet head 14 is connected to the output side of the control unit 30 through the print head driver 14b. The carriage motor 17 and paper transportation motor 25 are also connected to the output side of the control unit 30 through a motor driver 17a and motor driver 25a. Based on print data and commands received from a host device, the control unit 34 prints on the label paper 12a by moving the inkjet head 14 widthwise to the platen 19 while also controlling driving the paper transportation motor 25 to advance the label paper 12a a specific distance in conjunction with inkjet head 14 operation. The control unit 34 also controls driving the paper transportation motor 25 to convey the label paper 12a so that the printing start position on the label paper 12a is positioned to the printing position of the platen 19, and to advance the printed portion of the label paper 12a to the cutting position of the automatic cutter. The control unit 34 can calculate the transportation distance of the label paper 12a at this time by integrating the number of steps or the rotational distance that the paper transportation motor 25 is controlled to drive in the paper feed direction.

The differential signal extraction circuit 30 of the paper detector 26 is connected to the input side of the control unit 34.

The control unit 34 has an internal analog/digital (A/D) converter 36, and the amplified difference signal output by the differential signal extraction circuit 30 is input to the A/D converter 36. Based on the digital signal generated by the A/D converter 36 based on the amplitude of or waveform changes in the amplified difference signal, the control unit 34 detects the edge of a label 12c or a black mark BM passing the detection positions P1 and P2.

This label 12c or black mark BM edge detection process can be executed by a digital control method. For example, the control unit 34 may directly input the output voltage of the photodetectors 28A and 28B to the internal A/D converter 36, obtain the difference between the digital values, execute an amplification operation at a specific gain rate, and calculate the amplified difference. By determining if the amplified difference is greater than or equal to a preset threshold value, the timing at which the edge of a label 12c or black mark BM passed the detection positions P1 and P2 can be detected.

Label Detection Process

The label detection process in this embodiment of the invention is described next.

Figure 9:
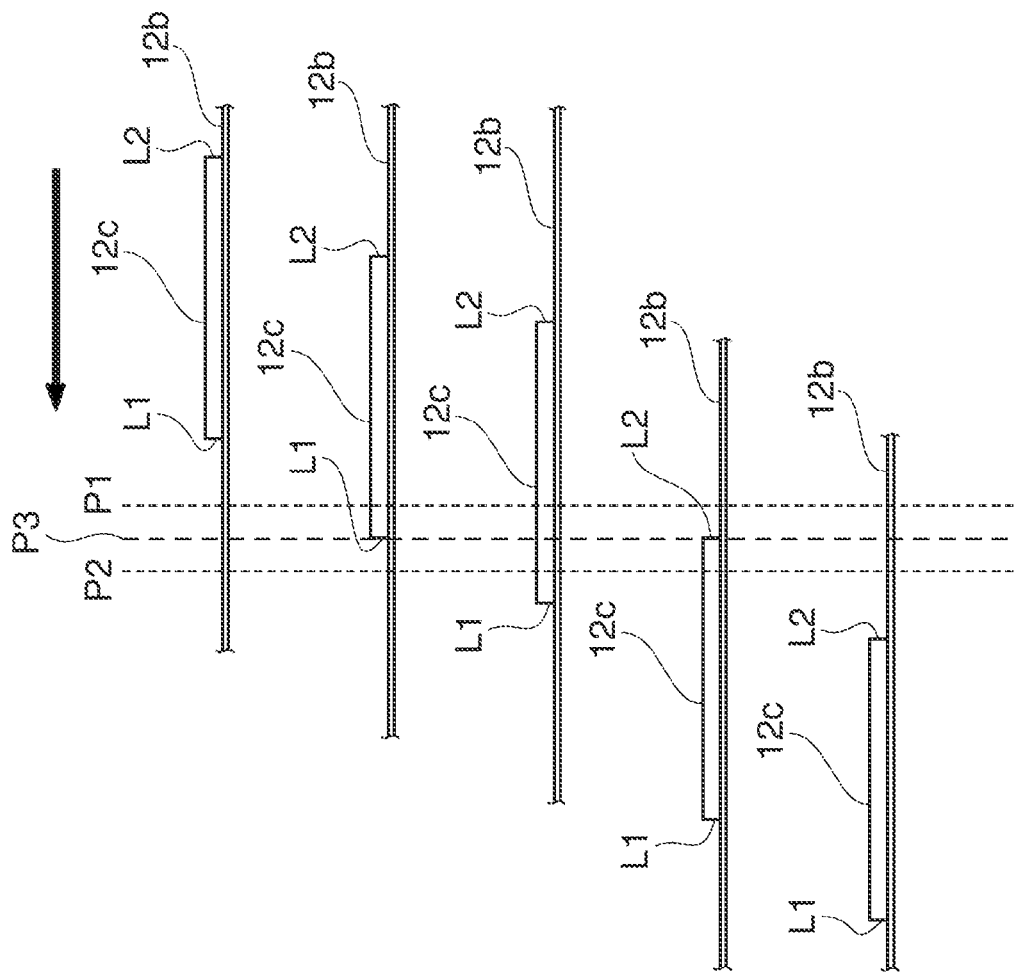
FIGS. 9A-9E illustrate the transportation of labels past the detection position.

FIG. 9 describes the transportation position of a label 12c when passing detection positions P1 and P2 in the sequence (a) to (e). In FIG. 9 (a) is the position where the leading end L1 of a label 12c is on the upstream side of detection position P1; (b) is the position where the leading end L1 of a label 12c is at the midpoint P3 between detection position P1 and detection position P2; (c) is the position where the leading end L1 of the label 12c is on the downstream side of detection position P2, and the trailing end L2 of the label 12c is on the upstream side of detection position P1; (d) is the position where the trailing end L2 of the label 12c is at the midpoint P3; and (e) is the position where the trailing end L2 of the label 12c is on the downstream side of detection position P2.

Figure 10:
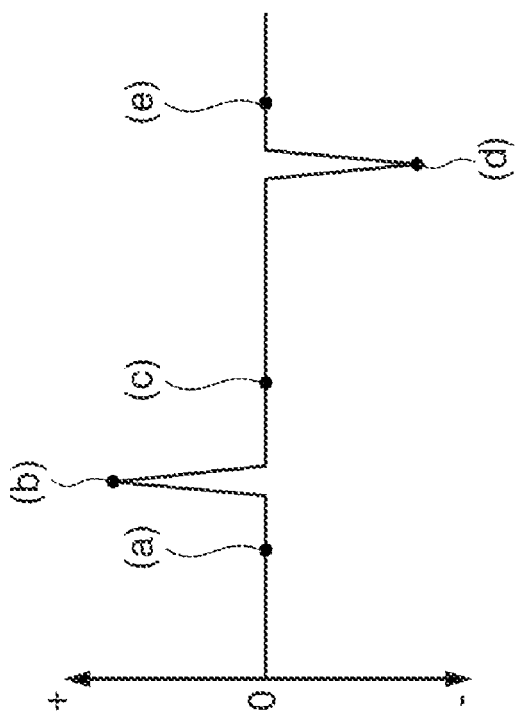
FIG. 10 is a waveform diagram showing the change in the output signal from the differential signal extraction circuit when a label passes the detection position.

FIG. 10 is a waveform diagram of the amplified difference signal output from the differential signal extraction circuit 30 when the label 12c passes detection positions P1 and P2. The transportation positions (a) to (e) in FIG. 9 are denoted by (a) to (e) in FIG. 10. Note that the waveform shown in FIG. 10 is a characteristic waveform whether the label 12c is detected using a reflection photosensor as shown in FIG. 5B, or the black mark BM is detected using a reflection photosensor as shown in FIG. 5C.

At each transportation position (a) to (e) in FIG. 9, the label gap G straddles the detection positions P1 and P2, and at transportation position (c) the label 12c straddles the detection positions P1 and P2. As a result, the output of the photodetectors 28A and 28B is equal at these transportation positions, and the amplified difference signal is substantially 0.

However, at transportation position (b), part of a low transmittance label 12c is at detection position P1, and the high transmittance label gap G is at detection position P2. As a result, the output from photodetector 28B is greater than the output from photodetector 28A, and the amplified difference signal has a specific positive value.

At transportation position (d), the high transmittance label gap G is at detection position P1, and part of the low transmittance label 12c is at detection position P2. The output of photodetector 28B is therefore less than the output of photodetector 28A, and the amplified difference signal has a specific negative value.

Because the low transmittance label 12c covers the photodetection surface 29 of the photodetector 28A when the leading end L1 of the label 12c passes detection position P1 while being conveyed, the difference between the detected outputs of the photodetectors 28A and 28B increases sharply, and the waveform of the amplified difference signal rises sharply. The amplified difference signal reaches a positive peak value when the leading end L1 reaches ((b) in FIG. 9) the midpoint P3 of the gap between the photodetectors 28A and 28B.

Because the label 12c covers the photodetection surface 29 of the photodetector 28B when the leading end L1 of the label 12c then passes detection position P2, the difference in the detected output of the photodetectors 28A and 28B drops sharply, and the waveform of the amplified difference signal drops sharply.

The amplified difference signal input to the A/D converter 36 is therefore a rising wave of a specific amplitude when the leading end L1 of the label 12c passes between the detection positions P1 and P2. When the trailing end L2 of the label 12c sequentially passes the detection positions P1 and P2, the waveform of the amplified difference signal is a falling wave with a waveform that is the inverse of the waveform when the leading end L1 passes.

Therefore, if this waveform is detected by the A/D converter 36, the leading end L1 and trailing end L2 of the label 12c can be detected passing the detection positions P1 and P2. Note that the amplitude of the rising or falling waveform corresponds to the difference in light detected by the photodetectors 28A and 28B, that is, to the difference in the transmittance of the part where the label 12c is affixed and the transmittance of the liner 12b part.

Anticipating label paper 12a in which the difference in transmittance between the label 12c part and the liner 12b part of the label paper 12a is the smallest of all types of label paper 12a expected to be used in the printer 1, the amplitude corresponding to this transmittance difference is set as the minimum signal amplitude (threshold value) to be detected by the A/D converter. This enables reliably detecting the edges of the labels 12c on all types of label paper 12a expected.

If only one of the rising or falling peaks is detected, either the leading end L1 or the trailing end L2 of the label 12c can be detected as it passes the detection positions P1 and P2. Note that the level of the amplified difference signal input to the A/D converter 36 must be set to the voltage range that can be detected by the A/D converter 36, and this adjustment can be done by, for example, setting the resistance of the resistors 33a to 33d so that the gain of the differential voltage from the differential amplifiers 31a and 31b is a suitable value.

The label detection process in this embodiment of the invention detects transmittance by a paper detector 26 each time the label paper 12a is conveyed a unit amount. The waveform of the amplified difference signal derived from this detector output is then analyzed based on the output signal from the A/D converter, and whether a positive or negative peak greater than or equal to the threshold value was detected is determined, or whether the absolute value of the amplified difference signal is greater than or equal to the threshold value is determined. As a result, whether the whether the leading end L1 or the trailing end L2 of a label 12c passed detection position P1 or P2 at each detection time can be detected. If at the same time it is also determined whether the amplified difference signal is positive or negative and the falling waveform and rising waveform are differentiated, whether the leading end L1 or the trailing end L2 is passing between the detection positions P1 and P2 can also be determined.

Figure 11:
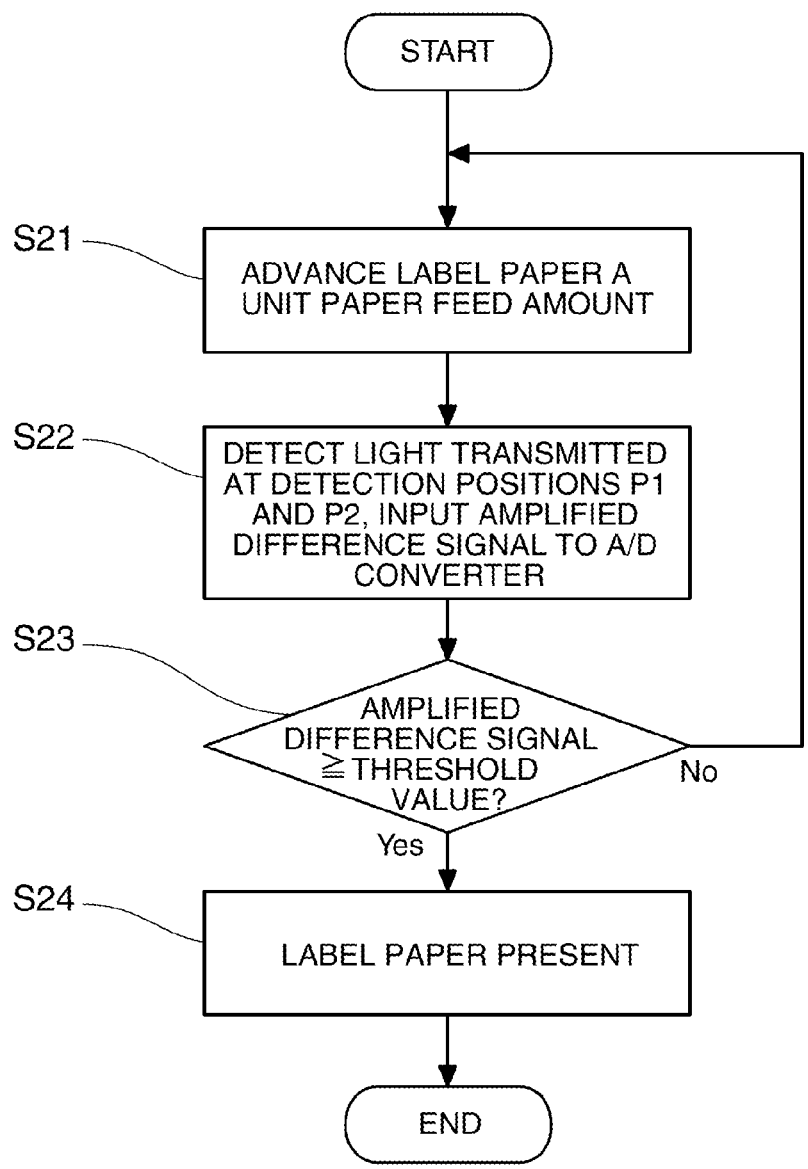
FIG. 11 is a flow chart of the label detection process.

FIG. 11 is a flow chart of the label paper detection process.

In step S21 the control unit 34 first controls the paper feed operation to advance the label paper 12a a unit paper feed distance. Next in step S22, the transmittance detection operation of the photodetectors 28A and 28B at detection positions P1 and P2 is executed, and an amplified difference signal is input from the differential signal extraction circuit 30 to the A/D converter 36.

Based on the digital signal from the A/D converter 36, whether the absolute value of the input amplified difference signal is greater than or equal to a preset threshold value is then determined in step S23.

If the control unit 34 determines in step S23 that the absolute value of the amplified difference signal is greater than or equal to the threshold value (step S23 returns Yes), control goes to step S24 and it is determined that the leading end L1 or the trailing end L2 of a label 12c was detected between the detection positions P1 and P2 (that is, a label was detected). The process then ends.

However, if the amplified difference signal is determined to not be greater than or equal to the threshold value in step S23 (step S23 returns No), it is determined that the leading end L1 or trailing end L2 of a label 12c was not detected between the detection positions P1 and P2 (that is, a label was not detected). Control then returns to step S21, and steps S21 to S23 repeat until an edge of a label 12c is detected.

The label paper detection method according to this embodiment of the invention described above thus enables detecting, based on the difference in the transmittance of the parts where a label 12c is affixed to the label paper 12a and the parts where only the liner is present, when an end part (leading end L1 or trailing end L2) of a label 12c passes between the detection positions P1 and P2.

Whether the leading end L1 or the trailing end L2 of the label 12c passed the detection positions P1 and P2 can also be determined in step S23 described above based on determining whether the amplified difference signal is positive or negative. By calculating the number of steps or the rotational amount the paper transportation motor 25 is driven from when the leading end L1 was detected, for example, the control unit 34 can also accurately know the paper feed position of each label 12c on the label paper 12a, and can accurately control transportation.

With the label paper detection method according to this embodiment of the invention, even if the absolute value of the reflectance or the transmittance differs greatly between the label 12c part and the liner 12b part, detection is possible insofar as there is at least an equal difference in the transmittance of the label 12c or the liner 12b. Various types of label paper 12a can therefore be used with no adjustment.

In addition, because the output of the photodetectors 28A and 28B can be adjusted in the range achieving a change in output corresponding to the change in the amount of light received, precise adjustment such as needed with the related art is not required. In addition, because evaluation is based on an amplified difference signal that suitably amplifies the differential output of the difference of the detected outputs, accurate detection is possible.

Note that while a transmission photosensor is used to detect the difference in transmitted light in the embodiment described above, a configuration using a reflection photosensor to detect the difference in reflected light is also conceivable. If the detection positions P1 and P2 are offset in the paper width direction in this configuration, the drop in detection accuracy that results when the detection positions P1 and P2 are proximal to each other in the transportation direction can be suppressed. In one example of such a configuration, the photodetectors 28A and 28B are disposed with the distance therebetween in the transportation direction identical to the configuration described above and a specific distance therebetween in the paper width direction of the label paper 12a, and a single light-emitting device 27 is disposed directly above each of the photodetectors 28A and 28B to emit a sensor beam for the corresponding photodetector.

While at least one preferred embodiment of the present invention has been described with reference to the accompanying drawings, various changes and modifications will be apparent to those skilled in the art in light of the foregoing disclosure. Any such change or modification is intended to be included within the scope of the present invention to the extent it is embraced in any of the claims of this application.

What is claimed is:

1. A label detection method, comprising steps of:
conveying label paper having labels affixed at intervals on a continuous liner through a transportation path;
detecting a plurality of detection beams of emitted light that are emitted to the label paper at a plurality of detection positions in the transportation direction of the label paper on the transportation path; and
detecting the labels or marks printed on the label paper based on a detected difference in the plurality of detection beams.

2. The label detection method described in claim 1, further comprising a step of:
determining if an edge part of a label or an edge part of a mark printed on the label paper is between the plurality of detection positions by determining if the difference in the plurality of detection beams is greater than a specific value.

3. The label detection method described in claim 1, wherein:
the emitted light is emitted from a single light-emitting device.

4. The label detection method described in claim 1, wherein:
a plurality of photodetection devices disposed to receive light from the plurality of detection positions to detect the transmission of the emitted light through the label paper, or to detect the reflection of the emitted light reflected by the label paper.

5. The label detection method described in claim 1, wherein:
a plurality of photodetection devices are disposed to receive light from the plurality of detection positions; and
a single light-emitting device is disposed opposite the photodetection devices with the transportation path therebetween.

6. The label detection method described in claim 1, wherein:
a plurality of photodetection devices are disposed to receive light from the plurality of detection positions; and
a single light-emitting device is disposed beside and between the photodetection devices, and emits the emitted light to the plurality of detection positions.

7. The label detection method described in claim 1, wherein:
two photodetection devices are disposed to receive light from two detection positions; and
the label detection method also has a step of determining if the difference of the outputs of the two photodetection devices based on the detected light is greater than a specified value.

8. A label printer, comprising:
a transportation mechanism that conveys label paper having labels affixed at intervals on a continuous liner through a transportation path;
a light-emitting unit that emits an emitted light to the label paper at a plurality of detection positions in the transportation direction of the label paper on the transportation path;
a plurality of detection units that detect detection beams of the emitted light at the plurality of detection positions; and
an evaluation unit that evaluates the position of the label or marks printed on the label paper based on a difference of the output values of the plurality of detection units.

9. The label printer described in claim 8, wherein:
the evaluation unit determines if an edge part of a label or an edge part of a mark printed on the label paper is between the plurality of detection positions by determining if the difference in the output values of the plurality of detection units is greater than a specific value.

10. The label printer described in claim 8, wherein:
the light-emitting unit is a single light-emitting device.

11. The label printer described in claim 8, wherein:
the detection units are photodetection devices, and detect the transmission of the emitted light through the label paper, or detect the reflection of the emitted light reflected by the label paper.

12. The label printer described in claim 8, wherein:
the detection units are photodetection devices;
the light-emitting unit is a single light-emitting device; and
the plurality of photodetection devices and the light-emitting device are disposed in opposition with the transportation path therebetween.

13. The label printer described in claim 8, wherein:
the detection units are photodetection devices;
the light-emitting unit is a single light-emitting device; and
the light-emitting device is disposed beside and between the photodetection devices.

14. The label printer described in claim 8, wherein:
the detection units are photodetection devices;
the label printer also has a differential signal extraction unit to which output from two photodetection devices is input, and which outputs a difference of the output values of the two photodetection devices to the evaluation unit; and
the evaluation unit determines if the label or an edge part of a mark printed on the label paper is between the two detection positions by determining if said difference is greater than a specified value.

15. The label printer described in claim 8, wherein:
the detection units are photodetection devices;
the label printer also has a differential amplifier unit that receives output from two photodetection devices, obtains and amplifies a difference of the outputs from the two photodetection devices, and outputs the amplified differential value to the evaluation unit; and
the evaluation unit determines if the label or an edge part of a mark printed on the label paper is between the two detection positions by determining if the amplified differential value is greater than a specified value.

* * * * *